TELEVISION RECEIVER
Filed Oct. 28, 1957
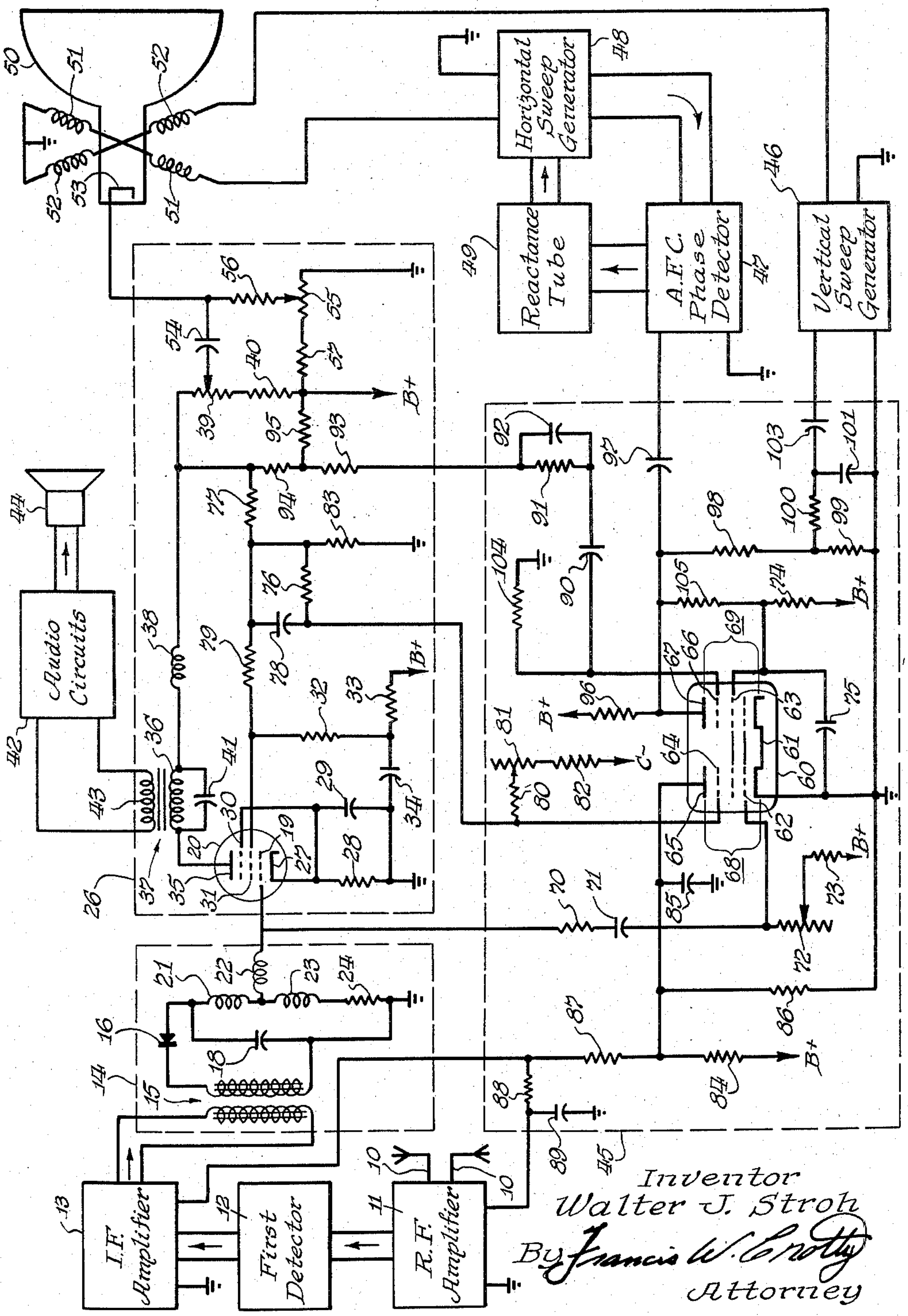
Inventor
Walter J. Stroh
By Francis W. Crotty
Attorney

United States Patent Office 2,891,106

Patented June 16, 1959

2,891,106

TELEVISION RECEIVER

Walter J. Stroh, Barrington, Ill., assignor to Zenith Radio Corporation, a corporation of Delaware Application October 28, 1957, Serial No. 692,864

3 Claims. (Cl. 178—7.3)

This invention relates to a new and improved television receiver and is particularly concerned with a synchronizing-signal separation system for a television receiver.

Noise signals have long presented substantial problems in the operation of television receivers, particularly in weak signal or so-called "fringe" areas. In many instances, the noise signals comprise pulses of very short duration but of much greater amplitude than the synchronizing-signal pulse components of the composite video signal. These extraneous high-amplitude noise impulses, if applied to the synchronizing system of the receiver, may result in false synchronization or in complete loss of synchronization in the reproduced picture. This difficulty has been substantially overcome in many commercial television receivers by means of a synchronizing-signal separator in which negative-polarity and positive-polarity composite video signals are simultaneously applied to the control electrodes of a multigrid sync-signal separator tube. The noise pulses in the negative-polarity signal interrupt conduction in the sync separator tube in time coincidence with occurrence of the corresponding noise impulses in the positive-polarity signal, thereby substantially eliminating the noise impulses in the output signal of the separator and affording stable operation in the line- and field-frequency scanning systems of the receiver. Noise-gated sync separation circuits of this kind are described and claimed in the copending application of Robert Adler and Meyer Marks, Serial No. 230,472, filed June 8, 1951, which issued as U.S. Patent No. 2,814,671 on November 26, 1957, and assigned to the same assignee as the present invention. In addition, a detailed description of the structure and operation of a system of this kind is set forth in an article entitled "An Economical Noise-Immune Sync Clipper" by M. Marks, pages 124–127 of the journal "Electronics" for April 1952.

Although synchronizing-signal separation circuits of the kind entailed in the above noted Adler et al. application and described in the aforementioned article of M. Marks are highly advantageous in preventing loss of synchronization due to high-amplitude noise impulses, they are still partially sensitive to low-amplitude noise. Consequently, extraneous noise signals having an amplitude approximately equal to that of the synchronizing-signal components of the composite video signal may in some instances cause false triggering of the scanning-signal generators of the television receiver. This problem is particularly important with respect to burst of high-duty-cycle noise which may result from the operation of certain home appliances, for example, vacuum cleaners. Such noise disturbances may disrupt the vertical sweep generator of the receiver, by causing false synchronization, especially when the receiver is operating under weak-signal conditions.

As employed herein the expression "bursts of high-duty-cycle noise" means impulse noise signals having a high duty cycle at least twice as long as the vertical sync pulse of the composite video signal.

It is a primary object of the invention to provide a new and improved synchronizing-signal separation system for a television receiver, which system is essentially noise-immune with respect to both high-amplitude noise impulses and bursts of low-amplitude high-duty-cycle noise.

A more specific object of the invention is a new and improved television receiver sync separation system which is not subject to false synchronization of the vertical scanning circuits caused by bursts of low-amplitude high-duty-cycle noise.

Another object of the invention is a new and improved noise-immune sync separation system for a television receiver which is inherently simple and economical in construction yet affords a higher degree of noise immunity than heretofore achieved.

The invention is adapted for use in a television receiver and is directed to a noise-gated synchronizing-signal separator. A sync separator constructed in accordance with the invention comprises an electron-discharge system including a cathode, an anode, a first control electrode, a screen electrode and an additional control electrode disposed in the order named between the cathode and the anode. Means are provided for applying a negative-polarity composite video signal to the first control electrode to cut off the electron discharge between the cathode and the anode upon occurrence of high-amplitude impulses in the video signal. In addition, the system includes means for applying a positive-polarity composite video signal to the additional control electrode to develop at the anode a synchronizing-control signal representative of the phase and frequency of the synchronizing-signal components of the composite video signal. The sync separator also includes a noise-bucking circuit for applying to the anode a signal reresenative of bursts of low-amplitude high-duty-cycle noise in phase opposition with respect to corresponding noise impulses in the synchronizing-control signal. This noise-bucking circuit includes a coupling impedance, preferably a resistance, interconnecting the screen electrode and the anode of the electron discharge system.

The features of the present invention which are believed to be novel are set forth with particularity in the appended claims. The organization and manner of operation of the invention, together with further objects and advantages thereof, may best be understood by reference to the following description taken in connection with the accompanying drawing, in which the single figure is a schematic diagram of a television receiver including a noise-immune synchronizing-signal separation system constructed in accordance with the invention.

The television receiver illustrated in the figure comprises an antenna 10 coupled to a radio-frequency amplifier 11 which, in turn, is coupled to a heterodyning stage or first detector 12. First detector 12 is coupled to an intermediate-frequency amplifier 13 which may include any desired number of stages. The IF amplifier is coupled to a second detector stage, enclosed within the dash outline 14, by means of a conventional IF transformer 15. The second detector circuit is of conventional form and comprises a diode 16 having its cathode connected to one terminal of the secondary winding of transformer 15; the other terminal of the transformer secondary is grounded. The anode of diode 16 is by-passed to ground for intermediate-frequency components by means of a capacitor 18; the anode of the diode is also coupled to the control electrode 19 of a pentode amplifier tube 20 by means of a peaking coil 21 and a coupling coil 22. Control electrode 19 of the amplifier is returned to ground through a circuit comprising a coil 23 connected in series with a resistor 24.

Tube 20 constitutes the amplifier tube of a video amplifier circuit 26; like detector circuit 14, amplifier 26 is of generally conventional construction. The cathode 27 of the amplifier tube is connected to ground through a biasing circuit comprising a resistor 28 and a shunt capacitor 29. The suppressor electrode 30 of the amplifier tube is directly connected to cathode 27 and its screen electrode 31 is connected to a source of positive unidirectional operating potential B+ through a pair of series connected resistors 32 and 33, the resistor 33 being by-passed to ground by a capacitor 34. The anode 35 of tube 20 is connected to D.C. source B+ through a series circuit comprising the primary winding 36 of a transformer 37, a peaking coil 38, a contrast control potentionmeter 39, and a load resistor 40. A capacitor 41 is connected across transformer primary 36 to form a parallel-resonant circuit which is tuned to a frequency corresponding to the difference between the video-signal carrier frequency and the sound-signal carrier frequency to derive intercarrier sound signals which are applied to the audio circuits 42 of the television receiver through the secondary winding 43 of transformer 37. Audio circuits 42 may include a suitable audio detector and an audio amplifier of any number of stages and are coupled to a loudspeaker 44.

The television receiver illustrated in the drawing further includes a gain control and synchronizing-signal separation system 45 which is coupled to both second detector 14 and video amplifier 26. The AGC potentials developed in system 45 are supplied to radio-frequency amplifier 11 and IF amplifier 13. Additional output circuits from system 45 are coupled to a vertical-frequency sweep generator 46 and to an automatic frequency control phase detector 47. The phase detector also derives a comparison signal from the output of a horizontal-frequency sweep generator 48. The output of the phase detector is applied to a reactance tube circuit 49 which in turn is coupled to sweep generator 48. The two sweep generators 46 and 48 are coupled to the deflection system of an image reproducer 50, the deflection system being represented schematically by the deflection coils 51 and 52. The cathode 53 of picture tube 50 is coupled to the variable tap of contrast control potentiometer 39 through a coupling capacitor 54. Cathode 53 is also connected to the variable tap of a brightness control potentiometer 55 through a resistor 56, the brightness control potentiometer being connected in series with an additional resistor 57 between B+ and ground. The remaining elements of the electron gun of picture tube 50 are entirely conventional and have been omitted from the drawing.

As thus far described, the television receiver illustrated in the drawing is entirely conventional; accordingly, only a very brief description of its operational characteristics is presented here. A transmitted signal intercepted at antenna 10 is amplified in RF amplifier 11 and applied to first detector 12, wherein the signal is heterodyned to a suitable intermediate frequency. The IF signal is amplified in circuit 13 and applied to second detector 14 through input transformer 15. Second detector 14 develops a negative-polarity composite video signal which is applied to amplifier tube 20 in the video amplifier 26. The amplified composite video signal appearing at the anode 35 of tube 20, which is of course inverted in phase with respect to the input signal from detector 14, is applied to cathode 53 of the picture tube to intensity-modulate the electron beam of the image reproducer in the usual manner. The intercarrier sound signals developed in the tuned circuit 36, 41 are supplied to the audio system and are utilized to reproduce the sound portion of the television broadcast. The synchronizing-signal components of the composite video signal are separated in system 45 and are applied to the sweep-signal generating circuits 46—49 of the receiver to control the phase and frequency of the scanning signals generated therein; these scanning signals are in turn supplied to the deflection yoke comprising coils 51 and 52 to control deflection of the electron beam across the image screen of picture tube 50. Circuit 45 also generates AGC potentials which are applied to amplifiers 11 and 13 to control the amplitude level of the IF signal supplied to detector 14.

The AGC and sync separator system 45 of the invention comprises an electron-discharge device 60, preferably constructed as a semi-divided pentode of the type commercially available under the designation 6BU8. Tube 60 includes a cathode 61, a common first control electrode 62, a screen electrode 63, a pair of individual additional control electrodes 64 and 66, and a pair of anode or output electrodes 65 and 67. The anodes 65 and 67 are individually associated with control electrodes 64 and 66 respectively. Tube 60 thus comprises two distinct and distinguishable electron-discharge systems; these are a gain-control discharge system 68 including electrodes 61—65 and a synchronizing-signal separation discharge system 69 comprising electrodes 61—63, 66 and 67. The cathode, first control and screen electrodes are common to the two systems.

First control electrode 62, which is common to the two discharge systems 68 and 69, receives negative-polarity composite video signals from second detector 14 by way of a series RC circuit comprising a resistor 70 and a coupling capacitor 71. The first control electrode is also connected to a biasing circuit comprising a potentiometer 72 and a bias resistor 73 which is returned to the positive D.C. source B+. Cathode 61 is grounded and screen electrode 63 is connected to B+ through a resistor 74. The screen electrode is also by-passed to ground through a capacitor 75.

The additional control electrode 64 of gain-control discharge system 68 is coupled to the output circuit of video amplifier 20 by means of a D.C. coupling circuit comprising two resistors 76 and 77 connected in series with each other between control electrode 64 and one terminal of contrast control potentiometer 39; the common terminal between resistors 76 and 77 is returned to ground through a resistor 83. Control electrode 64 is also connected to the video amplifier by an A.C. coupling circuit comprising a capacitor 78 and a resistor 79 connected in series with each other and returned to the screen electrode 31 of amplifier tube 20. Control electrode 64 is also connected to a voltage divider biasing circuit comprising, in series, a resistor 80, a potentiometer 81, and an additional biasing resistor 82 which is returned to a source of negative unidirectional operating potential C—.

Anode 65 of the gain-control discharge system is connected to B+ through a resistor 84 and is by-passed to ground for radio frequencies by a capacitor 85. The anode circuit further includes a resistor 86 which is returned to ground, the resistors 84 and 86 constituting a voltage divider which affords the desired operating potential for anode 65. Anode 65 is further connected to the input circuit of RF amplifier 11 by means of an integrating circuit including a pair of series-connected resistors 87 and 88, the shunt capacitor 85, and an additional shunt capacitor 89 which is returned to ground. The junction between resistors 87 and 88 is connected to the input circuits of one or more stages of IF amplifier 13.

The additional control electrode 66 of sync-separation discharge system 69 is coupled to the output circuit of video amplifier tube 20 by means of an A.C. coupling circuit comprising a coupling capacitor 90 connected in series with a parallel RC circuit including a resistor 91 and a capacitor 92, the other end of the RC circuit being connected to a voltage divider comprising a pair of resistors 93 and 94 connected in series with each other between the RC circuit and one terminal of the contrast control potentiometer 39. The common terminal of the resistors 93 and 94 is returned to B+ through a resistor 95. Control electrode 66 is also returned to ground through a resistor 104. Anode 67 of the sync-separation discharge system is connected to D.C. source B+ by means of a resistor 96 and is coupled to the AFC phase detector 47 by means of a coupling capacitor 97. Anode 67 is also returned to ground through a load circuit comprising a pair of series-connected resistors 98 and 99. An additional output circuit for the synchronizing-signal discharge system comprises an integrating circuit including a coupling resistor 100 connected to the common terminal of the two load resistors 98 and 99 and coupled to vertical sweep generator 46 through a coupling capacitor 103. The integrating circuit further includes a capacitor 101 connected between resistor 100 and ground. In addition, and most importantly in connection with the present invention, anode 67 of the sync separation discharge system is connected to screen electrode 63 of that system through a coupling impedance comprising a resistor 105.

In operation, the AGC and sync separator circuit 45 is in many respects quite similar to the substantially noise-immune sync separation circuits now in widespread use in the television industry and described in the aforementioned patent application of Robert Adler et al. and in the article by M. Marks. Moreover, the AGC and sync separation system 45 embodies the teaching of the copending application of Robert Adler and John G. Spracklen, Serial No. 568,049, filed February 27, 1956, and assigned to the same assignee as the present invention. Negative-polarity composite video signals are applied to the common first control electrode 62 from the second detector 14 of the receiver; the positive bias on control grid 62 is established at a level such that the electron stream in tube 60 is cut off by high-amplitude noise impulses but is not affected by normal video modulation or synchronizing-signal impulses in the composite video signal or by low-amplitude noise impulses. Consequently, sections 68 and 69 of tube 60 are both cut off by high-amplitude noise signals.

Both the A.C. and D.C. components of the amplified positive-polarity composite video signal are supplied, from video amplifier 26, to control electrode 64 of AGC discharge system 68 in time coincidence with the negative-polarity signal applied to control electrode 62. Control electrode 64 is biased negatively with respect to cathode 61 by the biasing circuit comprising resistors 80 and 82 and the potentiometer 81 which returns control electrode 64 to the negative D.C. source C—. Consequently, the AGC discharge system operates as a clipping amplifier. The signal appearing at anode 65 is representative of the peak amplitude lever of the synchronizing-signal portions of the composite video signal. No signal appears on anode 65 until the composite video signal exceeds a predetermined amplitude; beyond this threshold, the signal at anode 65 increases rapidly. This output signal is integrated to develop gain control potentials which are applied to amplifiers 11 and 13 to adjust the amplification levels in those circuits in accordance with received signal strength.

The A.C. components of the positive-polarity composite video signal are applied to control electrode 66 of sync separation discharge system 69, again in time coincidence with the negative-polarity signal applied to control electrode 62. The coupling impedances in the input circuit to control electrode 66 and resistor 104 are selected to afford a self-bias potential which is somewhat negative with respect to cathode 61; consequently, discharge system 69 also operates as a clipping amplifier and develops a synchronizing-control signal comprising pulses representative of the phase and frequency of the synchronizing-signal portions of the composite video signal. This synchronizing control signal is applied to the two output circuits which couple anode 67 to circuits 46 and 47. In this respect, the system operates in essentially the same manner as the synchronizing-signal separation systems described in the Marks article and in the two aforementioned copending patent applications.

In accordance with the invention, the sync signal separator comprising discharge system 69 is also effectively protected against the effects of low-amplitude high-duty-cycle noise, which is not eliminated by the noise-gating signal applied to control electrode 62 because of its low-amplitude level. In order to understand this additional noise-immunization fully, it is best to consider separately the effect of the two input signals supplied to the control electrodes 62 and 66. The positive-polarity signal applied to control electrode 66 modulates the electron stream in the discharge system 69 to develop the desired synchronizing-control signal. That is, when the applied signal is in the sync pulse amplitude range, the discharge system is maintained conductive, affording a negative-going control signal at the anode 67. In theory, at all other times the anode 67 is isolated and remains at a relatively high positive potential, the electron stream being cut off by the self bias developed in the input circuit of electrode 66. If, however, a noise signal of approximately the same amplitude as the sync pulse portions of the composite video signal appears on electrode 66, it produces a corresponding negative-polarity noise signal in the output from anode 67. Of course, the tube cannot be cut off at this time by the corresponding low-amplitude noise components of the gating signal applied to control electrode 62, since if this were the case no sync control signal could ever be developed at anode 67. The bias condition of electrode 62 permits signals of this amplitude level to be translated.

The same low-amplitude noise appearing upon control electrode 62, however, being of opposite polarity, induces a positive-going noise signal on the screen electrode 63, considering this electrode as an auxiliary anode. It is thus seen that the two noise signals induced at anode 67 and screen electrode 63 are of opposite polarity. Consequently, the coupling impedance 105 interconnecting electrodes 63 and 67 effectively bucks the two noise signals against each other and, if the impedance values of resistors 74 and 105 and condenser 75 are properly selected, may effectively eliminate the noise signal entirely from the output of the sync separator. Accordingly, the sync separator of the invention contains a self-balancing output circuit to cancel the low-amplitude high-duty-cycle noise signals.

Of course, if all low-amplitude signals, regardless of frequency and duration, were effectively bucked out by the interconnection of anode 67 and screen electrode 63, the sync separator would be disabled, since the sync pulses are in the same amplitude range as the low-amplitude noise which is to be eliminated. It has been found, however, that most of the troublesome noise in this amplitude range is of relatively long duration with respect to the vertical sync pulse; expressed differently, the particular problem under consideration is presented by bursts of noise signals having a high-duty cycle. Accordingly, it is possible to distinguish between the undesired noise signals and the desired sync signals on the basis of frequency and pulse duration. This selection is afforded by the by-pass capacitor 75 which represents a relatively low impedance to the short, low-duty-cycle fifteen kilocycle line-sync pulses but which constitutes a very substantial impedance to the high-duty-cycle noise signals in question.

Accordingly, the horizontal sync components of the signal induced on screen electrode 63 are effectively suppressed therefrom and do not cause cancellation of the horizontal sync components of the signal developed at anode 67. Therefore, the required horizontal sync components are delivered through condenser 97 to achieve proper synchronization of sweep generator 48.

At the same time, it is also necessary to permit the vertical sync components of the received signal to reach sweep generator 46 to control its operation. This is accomplished by having condenser 75 so large that it does not acquire any substantial charge during the interval of the vertical sync pulse. In other words, condenser 75 is chosen to have a charging time constant at least twice as long as the duration of the vertical sync pulse. Where this condition is met, there is no material cancellation of the vertical sync components of the signal developed at anode 67 and vertical synchronization does result.

However, the unwanted bursts of low-amplitude high-duty-cycle noise, which by definition are much longer than the vertical sync pulse, cause condenser 75 to charge in order to accomplish cancellation of such noise in the output of the sync separator. Accordingly, the sync separator of the invention effectively eliminates bursts of low-amplitude high-duty-cycle noise without adversely affecting operation of the system with respect to the desired sync pulses.

In order to afford a more complete and specific illustration of the invention, suitable impedance values of certain components and other circuit parameters for a sync separator constructed in accordance with the invention are set forth hereinafter. It should be understood that this material is included solely by way of illustration and in no sense as a limitation on the invention.

| | |
|---|---|
| Tube **60** | Type 6BU8 or equivalent. |
| B+ | +265 volts. |
| C− | −80 volts. |
| Resistor **74** | 27,000 ohms. |
| Resistor **91** | 100 kilohms. |
| Resistor **96** | 220 kilohms. |
| Resistor **98** | 82 kilohms. |
| Resistor **99** | 18 kilohms. |
| Resistor **100** | 22 kilohms. |
| Resistor **105** | 47 kilohms. |
| Capacitor **75** | 0.15 microfarad. |
| Capacitor **90** | 0.0033 microfarad. |
| Capacitor **92** | 470 micro-microfarads. |
| Capacitor **97** | 100 micro-microfarads. |
| Bias voltage, electrode **62** | −0.2 to +0.1 volt. |
| Bias voltage, electrode **63** | +66 volts. |
| Bias voltage, electrode **66** | −20 volts. |

Sync separator systems constructed in accordance with the invention afford substantially improved performance in television receivers, particularly in fringe areas or in other locations where low-amplitude high-duty-cycle noise presents a definite problem. With the invention, false synchronization or lack of synchronization due to such noise is substantially eliminated, thereby avoiding disturbing effects which have sometimes occurred in previously known arrangements, particularly in the vertical scanning circuits of the receiver. Moreover, this beneficial effect is achieved without sacrifice in performance of the receiver with respect to elimination of high-amplitude noise impulses and without requiring any additional expensive and complex noise-elimination circuit.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. In a television receiver, a noise-gated synchronizing-signal separator comprising: an electron-discharge system including a cathode and an anode, with a first control electrode, a screen electrode and an additional control electrode disposed in the order named between the cathode and the anode; means for applying a negative-polarity composite video signal to said first control electrode to cut off the electron discharge between said cathode and said anode upon occurrence of high-amplitude noise impulses in said video signal; means for applying a positive-polarity composite video signal to said additional control electrode to develop at said anode a synchronizing-control signal representative of the phase and frequency of the synchronizing-signal components of said composite video signal; and means comprising a noise-bucking circuit for applying to said anode a signal representative of bursts of low-amplitude high-duty-cycle noise impulses in phase opposition with respect to corresponding noise impulses in said synchronizing-control signal, said noise-bucking circuit including a coupling impedance interconnecting said screen electrode and said anode.

2. In a television receiver, a noise-gated synchronizing-signal separator comprising: an electron-discharge system including a cathode and an anode, with a first control electrode, a screen electrode and an additional control electrode disposed in the order named between the cathode and the anode; means for applying a negative-polarity composite video signal to said first control electrode to cut off the electron discharge between said cathode and said anode upon occurrence of high-amplitude noise impulses in said video signal; means for applying a positive-polarity composite video signal to said additional control electrode to develop at said anode a synchronizing-control signal representative of the phase and frequency of the synchronizing-signal components of said composite video signal; bias means for normally maintaining said screen electrode at a positive operating potential with respect to said cathode; and means comprising a noise-buckling circuit for applying to said anode a signal representative of bursts of low-amplitude high-duty-cycle noise impulses in phase opposition with respect to corresponding noise impulses in said synchronizing-control signal, said noise-bucking circuit including a D.C. coupling impedance interconnecting said screen electrode and said anode and a by-pass capacitor having a low impedance to the line-sync pulses of said video signal coupling said screen electrode to a plane of reference potential.

3. In a television receiver, a noise-gated synchronizing-signal separator comprising: an electron-discharge system including a cathode and an anode, with a first control electrode, a screen electrode and an additional control electrode disposed in the order named between the cathode and the anode; means for applying a negative-polarity composite video signal to said first control electrode to cut off the electron discharge between said cathode and said anode upon occurrence of high-amplitude noise impulses in said video signal; means for applying a positive-polarity composite video signal to said additional control electrode to develop at said anode a synchronizing-control signal representative of the phase and frequency of the synchronizing-signal components of said composite video signal; bias means for normally maintaining said screen electrode at a positive operating potential with respect to said cathode; and means comprising a noise-bucking circuit for applying to said anode a signal representative of bursts of low-amplitude noise impulses in phase opposition with respect to corresponding noise impulses in said synchronizing-control signal, said noise bucking circuit including a resistor interconnecting said screen electrode and said anode and a by-pass capacitor having a low impedance to the line-sync pulses of said video signal, having a charge time constant at least twice as long as the vertical sync pulse of a received composite television signal and coupling said screen electrode to a plane of reference potential.

No references cited.